United States Patent
Zitlaw et al.

(10) Patent No.: US 11,316,687 B2
(45) Date of Patent: Apr. 26, 2022

(54) ENCRYPTED GANG PROGRAMMING

(71) Applicant: Cypress Semiconductor Corporation, San Jose, CA (US)

(72) Inventors: Clifford Zitlaw, San Jose, CA (US); Markus Unseld, Elchingen (DE); Sandeep Krishnegowda, Santa Clara, CA (US); Daisuke Nakata, Yokohama (JP); Shinsuke Okada, Kawashaki (JP); Stephan Rosner, Campbell, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 47 days.

(21) Appl. No.: 16/714,274

(22) Filed: Dec. 13, 2019

(65) Prior Publication Data
US 2020/0287716 A1 Sep. 10, 2020

Related U.S. Application Data

(60) Provisional application No. 62/813,657, filed on Mar. 4, 2019.

(51) Int. Cl.
*H04L 29/06* (2006.01)
*H04L 9/14* (2006.01)
*H04L 9/32* (2006.01)
*H04L 9/08* (2006.01)

(52) U.S. Cl.
CPC .............. *H04L 9/14* (2013.01); *H04L 9/0825* (2013.01); *H04L 9/0861* (2013.01); *H04L 9/3278* (2013.01); *H04L 63/068* (2013.01)

(58) Field of Classification Search
CPC ....... H04L 9/14; H04L 9/0825; H04L 9/0861; H04L 9/3278; H04L 63/068; G06F 21/10; G06F 21/62; G06F 21/00; G06F 21/575; G11C 16/0483; G11C 16/08; G11C 16/10
See application file for complete search history.

(56) References Cited

U.S. PATENT DOCUMENTS

| | | |
|---|---|---|
| 5,606,710 A | 2/1997 | Hall et al. |
| 6,381,177 B1 | 4/2002 | Sandra et al. |
| 6,535,780 B1 | 3/2003 | Anderson et al. |
| 6,687,496 B1 | 2/2004 | Nangle |
| 6,714,457 B1 | 3/2004 | Hsu et al. |

(Continued)

OTHER PUBLICATIONS

"Cyclone LC In-system Flash Programmers," P&E Microcomputer Systems Inc. Nov. 2019, pp. 1-7; 7 pages.

(Continued)

*Primary Examiner* — Yogesh Paliwal

(57) ABSTRACT

Disclosed are apparatus and methods for programming a plurality of nonvolatile memory (NVM) devices. Each NVM device self-generates and stores a unique encryption key. Each NVM device concurrently receives an image from a multiple-device programming system to which all the NVM devices are communicatively coupled. Each NVM device encrypts the received image using such NVM device's unique encryption key to produce a unique encrypted image for each NVM device. Each NVM device stores its unique encrypted image within a nonvolatile memory of such NVM device. The unique encryption key can then be securely transferred to a host device for decrypting the image accessed from one of the NVM devices.

19 Claims, 10 Drawing Sheets

(56) References Cited

U.S. PATENT DOCUMENTS

| | | |
|---|---|---|
| 7,173,859 B2 | 2/2007 | Hemink |
| 7,461,199 B2 | 12/2008 | Conley et al. |
| 8,516,274 B2 | 8/2013 | Weingarten |
| 8,825,934 B2 * | 9/2014 | Sleator .................. G06F 13/00 710/110 |
| 9,083,685 B2 | 7/2015 | Lin et al. |
| 9,195,806 B1 * | 11/2015 | Robinson ............ G06F 12/1408 |
| 10,014,317 B2 | 7/2018 | Peng |
| 2007/0098179 A1 | 5/2007 | Nave |
| 2009/0113116 A1 | 4/2009 | Thompson et al. |
| 2010/0310075 A1 * | 12/2010 | Lin .................. G11B 20/00224 380/278 |
| 2010/0310076 A1 * | 12/2010 | Barzilai .............. H04L 63/0485 380/278 |
| 2013/0094294 A1 | 4/2013 | Kwak et al. |
| 2014/0082459 A1 * | 3/2014 | Li .......................... G11C 29/52 714/773 |
| 2014/0258736 A1 * | 9/2014 | Merchan ................ G06F 21/62 713/193 |
| 2015/0078550 A1 * | 3/2015 | Ferguson ................ H04L 9/088 380/44 |
| 2015/0106631 A1 | 4/2015 | Bettendorff |
| 2016/0148664 A1 * | 5/2016 | Katoh ..................... G06F 21/72 365/148 |
| 2019/0325938 A1 | 10/2019 | Lee |

OTHER PUBLICATIONS

"In-System Device Programming Guide," JTAG Technologies, May 2017, pp. 1-20; 20 pages.

Ricchetti, Mike, "A Fast Access Controller for In-System Programming of FLASH Memory Devices," Intellitech Corporation, Apr. 2003, pp. 1-10; 10 pages.

Adi, Weal, "Autonomous Physical Secret Functions and Clone-Resistant Identification," International Journal of Advanced Science and Technology, vol. 14, Jan. 2010, pp. 29-40; 12 pages.

International Search Report for International Application No. PCT/US20/017148 dated May 11, 2020; 2 pages.

Written Opinion of the International Searching Authority for International Application No. PCT/US20/017148 dated May 11, 2020; 4 pages.

* cited by examiner

ENCRYPTED GANG PROGRAMMING

CROSS-REFERENCE TO RELATED APPLICATIONS

This application claims the benefit of prior application U.S. Provisional Application No. 62/813,657, filed 4 Mar. 2019, which application is herein incorporated by reference in its entirety for all purposes.

TECHNICAL FIELD OF THE INVENTION

The invention generally relates to the field of programming nonvolatile memory devices with a gang system. More particularly the present invention relates to gang programming encrypted data into nonvolatile memory devices, as well as use and access of such encrypted data programmed into the nonvolatile memory devices.

BACKGROUND

Generally, programming of images into nonvolatile memory devices, such as NOR Flash devices, can be a time consuming and expensive activity for original equipment manufacturers (OEMs). If possible, OEMs prefer to program a large portion (or all) of an image into the device using a gang programmer. Gang programmers allow for high productivity and low costs when programming an identical image into multiple devices. When the image needs to be uniquely encrypted for each device, the gang programming approach is problematic Accordingly, there is a continued demand for improved systems and techniques for programming uniquely encrypted images into multiple nonvolatile memory devices using gang programming systems or other types of multi-device programmers.

SUMMARY

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In one embodiment, a method of programming a plurality of nonvolatile memory (NVM) devices is disclosed. In each NVM device, a unique encryption key is self-generated and stored. In each NVM device an image is also concurrently received from a multiple-device programming system to which all the NVM devices are communicatively coupled. Each NVM device encrypts the received image using such NVM device's unique self-generated encryption key to produce a unique encrypted image for each NVM device. Each NVM device store its unique encrypted image within a nonvolatile memory of such NVM device.

In specific implementations, the self-generating of the unique encryption key in each NVM device is performed by a true random number generator, a physical unclonable function (PUF) applied to a microstructure having a unique response in each NVM device. In other examples, the key is self-generated based on a unique identifier stored in each NVM device and/or one or more encryption key parameters configured in each NVM device.

In another embodiment, the image is received in chunks, and the method further comprising collecting and storing, by each NVM device, a number of the received chunks that corresponds to a page size of each NVM device prior to encrypting the collected chunks together into an encrypted collection of chunks that are stored in the nonvolatile memory array. In another features, the method includes verifying whether the image was programmed, encrypted, and stored accurately in each NVM device and thereafter deactivating such verifying operation in each NVM device that passes verification.

In another embodiment, after a first one of the NVM devices has completed storing of its unique encrypted image within a nonvolatile memory of the first NVM device, the first NVM device is mounted on a printed circuit board that include a host device. The unique encryption key is transferred from the first NVM device to the host device. After the unique encryption key is transferred, the first NVM device may destroy its unique encryption key that is stored in the first NVM device and the host device can perform field operations by accessing one or more portions of the encrypted image from the first NVM device and using the transferred encryption key to decrypt the accessed one or more portions of the encrypted image. In a further embodiment, the unique encryption key from the first NVM device is transferred using a secure channel by use of a public key paired with a private key for (i) the first NVM device encrypting the unique encryption key with the private key and (ii) the host device decrypting the unique encryption key with the public key that is paired with the private key.

In a further implementation, the image received by each NVM device is in an encrypted form that is based on a second encryption key, and the method further comprises (i) in the NVM device, receiving the second encryption key in an encrypted form that is based on a private encryption key associated with a public encryption key; (ii) providing the public encryption key to each NVM device; (iii) prior to encrypting and storing the received image, each NVM device decrypts the second encryption key using the public encryption key; and (iv) prior to encrypting and storing the received image, each NVM device decrypts the encrypted image using the decrypted second encryption key.

In an alternative embodiment, the invention pertains to an NVM device that includes an NVM array for storing data and a key generator for generating and storing a unique encryption key. This device includes a controller operable for performing any combination of the above-described operations. In a system embodiment, the NVM device is mounted on a printed circuit board that also includes a host device to which the NVM device is communicatively coupled. The controller of the NVM device is further configured for (i) transferring the unique encryption key to the host device and (ii) after the unique encryption key is transferred, destroying the unique encryption key that is stored in the NVM array of the NVM device. In this aspect, host device is further configured for, after the unique encryption key is transferred, performing field operations by accessing one or more portions of the encrypted image from the NVM array of the NVM device and using the transferred encryption key to decrypt the accessed one or more portions of the encrypted image These and other aspects of the invention are described further below with reference to the figures.

DETAILED DESCRIPTION OF EXAMPLE EMBODIMENTS

In the following description, numerous specific details are set forth in order to provide a thorough understanding of the present invention. The present invention may be practiced without some or these specific details. In other instances, well known process operations have not been described in detail to not unnecessarily obscure the present invention. While the invention will be described in conjunction with the specific embodiments, it will be understood that it is not intended to limit the invention to the embodiments.

Nonvolatile memory (NVM) devices generally encompass integrated circuit devices that include at least one nonvolatile memory module, such as a programmable memory array. NVM devices can include the following device types: PROM (programmable read-only memory), EPROM (erasable PROM), EEPROM (electrically-erasable PROM), Flash memory (such as the Semper Secure NOR Flash device by Cypress Semiconductor Corp. of San Jose, Calif., eMMC (embedded multi-media card), MRAM (magneto-resistive random-access memory), FeRAM (ferroelectric RAM), NVRAM (nonvolatile RAM), and MCU (microcontroller unit). NVM devices are typically programmed before or after being arranged, routed, and packaged together with other integrated circuit devices to form a system or product. It is noted that the terms nonvolatile programmable device and nonvolatile memory device are used interchangeably here. For instance, one or more NVM devices and other device types may be arranged, bonded, routed, and packaged on a printed circuit board in a packaged system device.

It is often desirable to program a uniquely encrypted image into each NVM device manufactured by an original equipment manufacturer (OEM) for use in a system or product. One approach is to uniquely program each NVM device separately on-board, which approach is very time-consuming and, thus, resulting in a significant bottleneck in production of systems that incorporate such NVM devices.

Another approach is to implement a gang programming system to program an encrypted image simultaneously onto multiple memory devices. Other multi-device programmers may be implemented besides gang programmers, such as specialized programmers for certain circuit types only, such as FPGA, microcontroller, and EEPROM programmers. However, this approach is generally limited to programming identical encrypted images onto multiple NVM devices.

Figure 1:
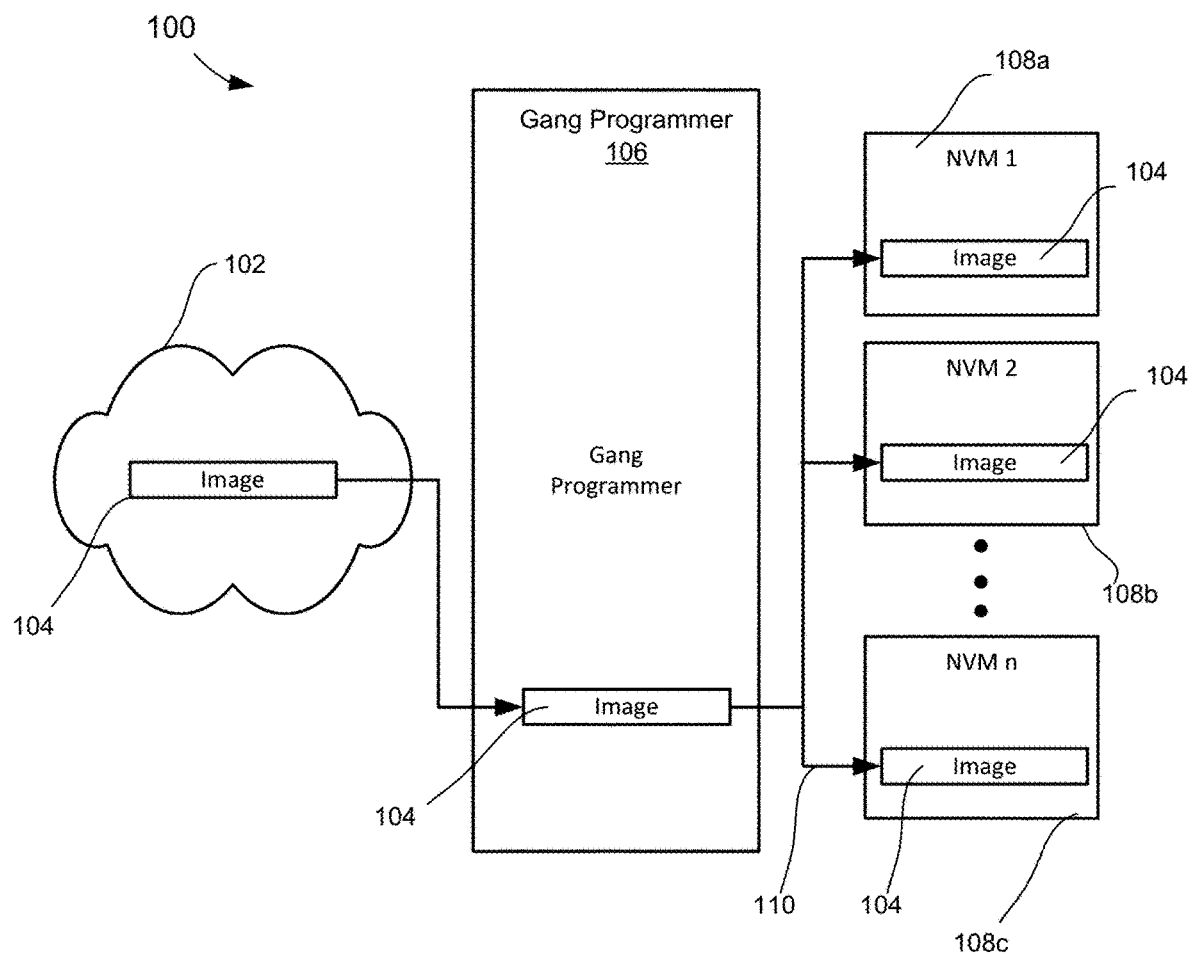
FIG. 1 is a diagrammatic representation of a gang programming environment for parallel programming multiple NVM devices.

FIG. 1 is a diagrammatic representation of a gang programming environment 100 for parallel programming of a same image 104 into multiple NVM devices, such as 108a-c, (e.g., NVM 1, NVM 2, . . . , and NVM n). As shown, a gang programmer 106 has access to image data 104, for example, via a network 102 from any suitable type of serving device or database system. The image 104 can be in any suitable form, such as plaintext or encrypted plaintext. However, the gang programmer can access only a single image 104 for programming into multiple NVM devices (e.g., 108a-c). That is, the same image 104 is programmed into each of the NVM devices. Although a gang programming system can efficiently program an image into multiple NVM devices at once, gang programming systems do not currently have the capability of concurrently programming a unique encrypted image into each of the NVM devices.

In view of the above, it would be beneficial to provide NVM devices that facilitate unique encryption in a gang programming system environment (or other type of parallel programming environment for NVMs). In certain embodiments, nonvolatile programmable devices can be configured to integrate several cryptographic functions, including the ability to perform encryption and key generation. Cryptographic functions built into nonvolatile (NVM) memory devices can allow each of the devices in a gang programming environment to perform self-encryption as the same non-encrypted image is being provided to the device. The encryption key can later be transferred in a secure manner to a microcontroller unit (MCU) (or any other host or master processor/controller unit), which then can access the NVM device's data during field operation.

Figure 2:
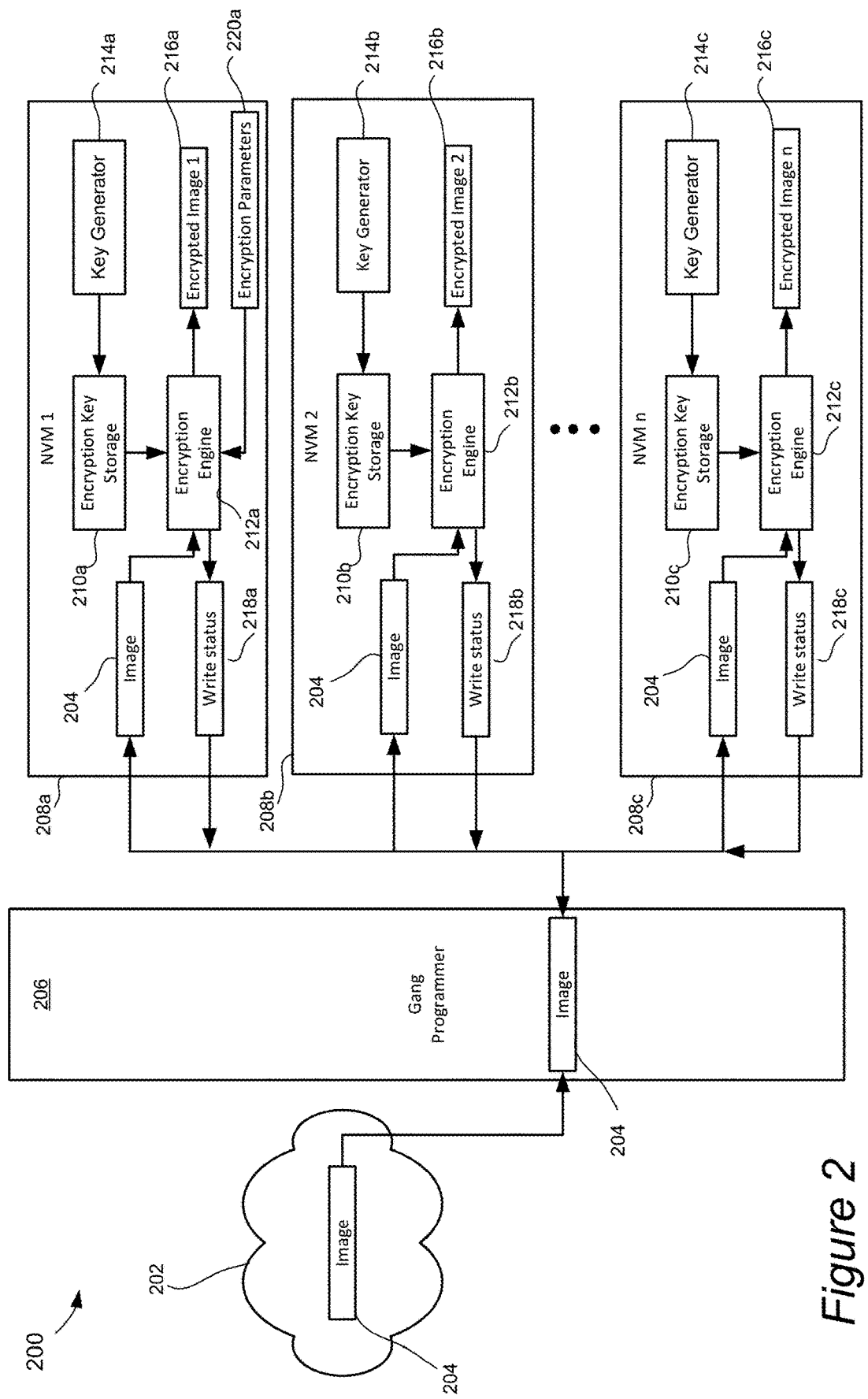
FIG. 2 is a diagrammatic representation of a gang programmer environment for programming self-encrypting NVM devices in accordance with one embodiment of the present invention.
Figure 3:
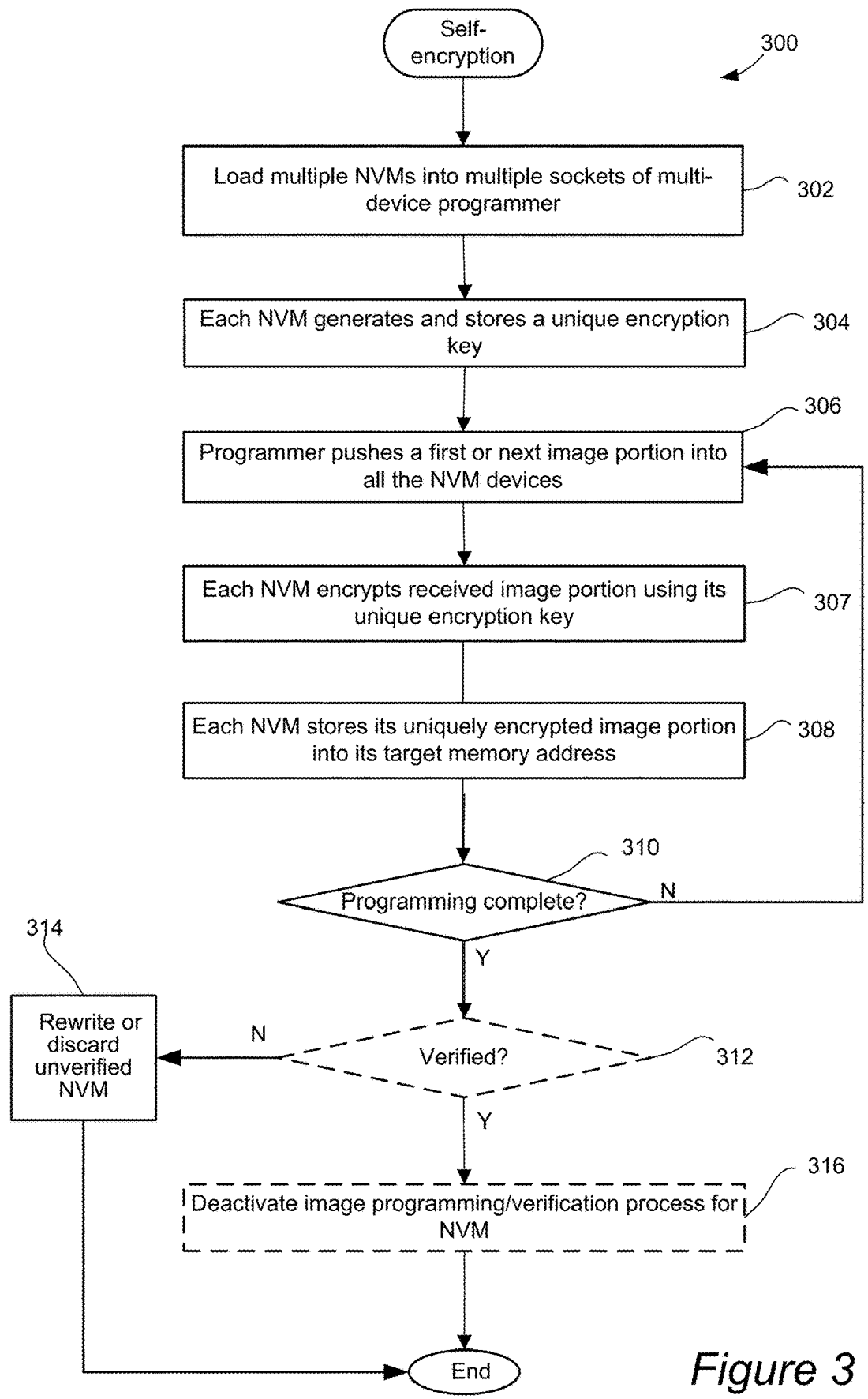
FIG. 3 is a flow chart illustrating a process for self-encryption in accordance with a specific implementation of the present invention.

FIG. 2 is a diagrammatic representation of a gang programmer environment 200 for programming self-encrypting NVM devices (e.g., 208a, 208b, . . . , and 208c) in accordance with one embodiment of the present invention. FIG. 3 is a flow chart illustrating a process for self-encryption 300 in accordance with a specific implementation of the present invention. This process 300 will be described in the context of the example environment 200 of FIG. 2 and in accordance with multiple embodiments. Each self-encrypting NVM device may include any suitable self-encryption functionality, which may generally be implemented in any suitable combination of hardware and software as described further below.

As shown, a gang programmer 206 is communicatively coupled with each NVM device (e.g., 208a-c). For example, the programmer may include a plurality of sockets into which the NVM devices are inserted for programming. These sockets can be built into the programmer device body or be attached to cables that are coupled to the programmer body (although this configuration is used mainly for on-board programming). The programmer may include any suitable type and number of sockets for programming multiple devices, depending on the NVM device's pin configuration and communication protocol for data writes. By way of examples, the gang programmer may include 4, 8, 16, or 100 sockets.

The programmer may also utilize any suitable communication protocol for programming (and verifying) an image with respect to multiple NVM devices. For flash/EEPROM/MCU memory, the Serial Peripheral Interface (SPI) protocol may be utilized to push (or receive) data over an SPI bus coupled with each of the NVM devices. In a more specific example, the SPI bus of the programmer may use a quad IO configuration that includes the following signals/pins for each NVM device: 1 chip select pin (CS) for enabling each device, 4 half-duplexed serial input/output pins (IO0, IO1, IO2, IO3) for serial data/address/command input and output, and 1 clock pin (CK). The CK signal may be used to specify four different modes with respect to the IO signals (command, program, read, etc.) based on four different combinations of polarity and phase values. Different modes may also be specified in specific cycles of the IO signals. Of course, the programmer may utilize other pin configurations, such as 3-wire or 4-wire configuration, although not as efficient as a quad IO configuration. Each NVM device may share the IO and CLK signals. However, each NVM device may receive its own CS signal for verifying data from different NVM devices.

Each NVM device may include a key generator (e.g., 214a, 214b, and 214c) for generating a unique encryption key, which is received and stored within its respective encryption key storage register (e.g., 210a, 210b, and 210c). Each NVM device may also comprise an encryption engine (e.g., 212a, 212b, and 212c) for receiving an image 204 from a gang programmer 206, encrypting such received image, and storing the resulting encrypted image (e.g., 216a, 216b, and 216c), for example, in the NVM device's nonvolatile memory array (not shown).

As illustrated in FIG. 3, multiple NVM devices may initially be loaded into corresponding sockets of a multiple-device programmer (e.g., gang programmer 206) in operation 302. For instance, multiple NVMs (NVM 1, NVM 2, . . . , NVM n) are loaded into multiple sockets of a gang programmer 206. Depending on the NVM device type or status, each loaded NVM device may contain no programmed image data or contain programmed image data that is to be partially or completely overwritten.

Each NVM also generates and stores a unique encryption key in operation 304. For instance, the key generator 214a of NVM 208a generates a unique encryption key, which is then stored in encryption key storage 210a. The key generator may generate the unique encryption key at any time prior to or concurrently with the writing process. The key generation process may be triggered in any suitable manner. For instance, the key generation program may be initiated after the NVM is manufactured by a host device or by the gang programmer prior to programming. For instance, the gang programmer can be programmed to initiate a pre-defined command, which initiates key generation for each NVM device that is loaded into the programmer prior to programming. Alternatively, the NVM may be configured to generate its unique encryption key when it receives a "program initiation" indication specified in the IO bus signals and before/after the first image portion is received and prior to encrypting such image portion.

Any suitable key generation technique may be used to generate a unique encryption key. By way of examples, the key generator may take the form of a true random number generator (TRNG) or a physically unclonable function (PUF), or generators using other random number algorithms known in the art. A PUF is a physically defined "digital fingerprint" that serves as a unique identifier for a semiconductor microstructure fabricated in the NVM, such as based on unique physical variations which occur naturally during semiconductor manufacturing. A PUF is a physical entity embodied in a physical structure. In a PUF implementation, the key generator may be operable to apply a physical stimulus to a selected physical microstructure that reacts in an unpredictable way due to the complex interaction of the stimulus with the physical microstructure of the device and the response used to form the unique key. For instance, the key generator can use a fuzzy extractor or key extractor to extract a unique strong cryptographic key from the physical microstructure. In another key generation example, the unique key could be based on a non-random number, such as a unique identifier (e.g., serial number) associated with the NVM, or any suitable entropy source that is configured to generate a key that is likely to be unique (e.g., has a likelihood value that is above a predefined threshold). The key generator may be implemented in any suitable combination of hardware and software.

The key generation may use a static algorithm or be dynamically configurable. In one example, one or more encryption key parameters may be configured on the NVM, such as by writing predefined values corresponding to selected parameters into one or more registers, such as encryption parameters register 220a for NVM 208a. Of course, all the NVMs may have such feature. That is, each NVM can be preconfigured or setup to specify one or more encryption parameters for how encryption is to be performed prior to programming. Example setup encryption parameters include encryption algorithm selection, key length, an initial value, etc.

The programmer (e.g., 206) may push a first image portion into all of the NVM devices in operation 306. As described above, the gang programmer 206 obtains the image 204 in any suitable manner, such as via a network 202 from another server/storage device that is also communicatively coupled with such programmer 206. Additionally, the image may be downloaded into the programmer from a computer readable medium. The programming process may utilize any suitable protocol. In a quad-IO interface example, each NVM receives the image in 16-byte chunks. Of course, other chunk sizes may be received, depending on the particular configuration of the pins. The image data itself may be any suitable format that can be encrypted or is an unencrypted image, such as plaintext, etc.

Each NVM also encrypts its received image portion using its unique encryption key in operation 307. Each NVM also stores each encrypted image portion in its target memory address in operation 308. For instance, encryption engine 212a of NVM 208a encrypts each received image portion of image 204. Prior to encrypting, the encryption engine may also wait until enough image portions are collected to fill the corresponding target page of the NVM's memory array. For example, if the programmer pushes 16 bytes of the image 204 (via 4 IO pins) at a time to NVM 208a, the encryption engine 212a may be configured to wait until 16 chunks of 16-byte image portions are received and collected prior to encrypting and storing all of the 256 bytes of image data together staring at the target array address. A portion of the NVM's memory array may be used to store multiple chunks of received image until the size of received image chunks corresponds to the target address or page size. Alternatively, each image chunk is temporarily stored, encrypted, and then stored temporarily until enough encrypted chunks are collected to then be written into the target address. If there is enough memory, the entire image or encrypted image may be collected prior to encrypting or storing, respectively, the entire image or encrypted image, respectively.

It may then be determined whether programming is continuing in operation 310. That is, it is determined whether the programmer signaled that the programming process is complete. The self-encryption process continues to be repeated for each received image portion until programming ends.

The encrypted image written to the target array addresses for each NVM device may also be optionally verified in operation 312. After each encrypted image portion is written into the array of NVM 208a, the encryption engine of each NVM device may also be configured to decrypt and compare each image portion. A Write Status 218a may be updated for such image portion (e.g., by encryption engine 212a) and this register can be read and checked by the programmer to determine whether the image portion was successfully encrypted and written into the array. Alternatively, each NVM device may be configured to decrypt all (or each chunk) of the encrypted image data and transfer the decrypted data to the programmer or a host processor for comparison to the original image (or via checksum comparison) for verification purposes although this verification process is less secure. If the encrypted image fails verification, the image (or image portion) may be rewritten into the NVM or the NVM discarded as defective in operation 314.

After an NVM is programmed (and verified), the programming process for the NVM may then be deactivated in operation 316. For instance, the read verification operation for use during verification may be disabled via an NVM register.

Figure 4:
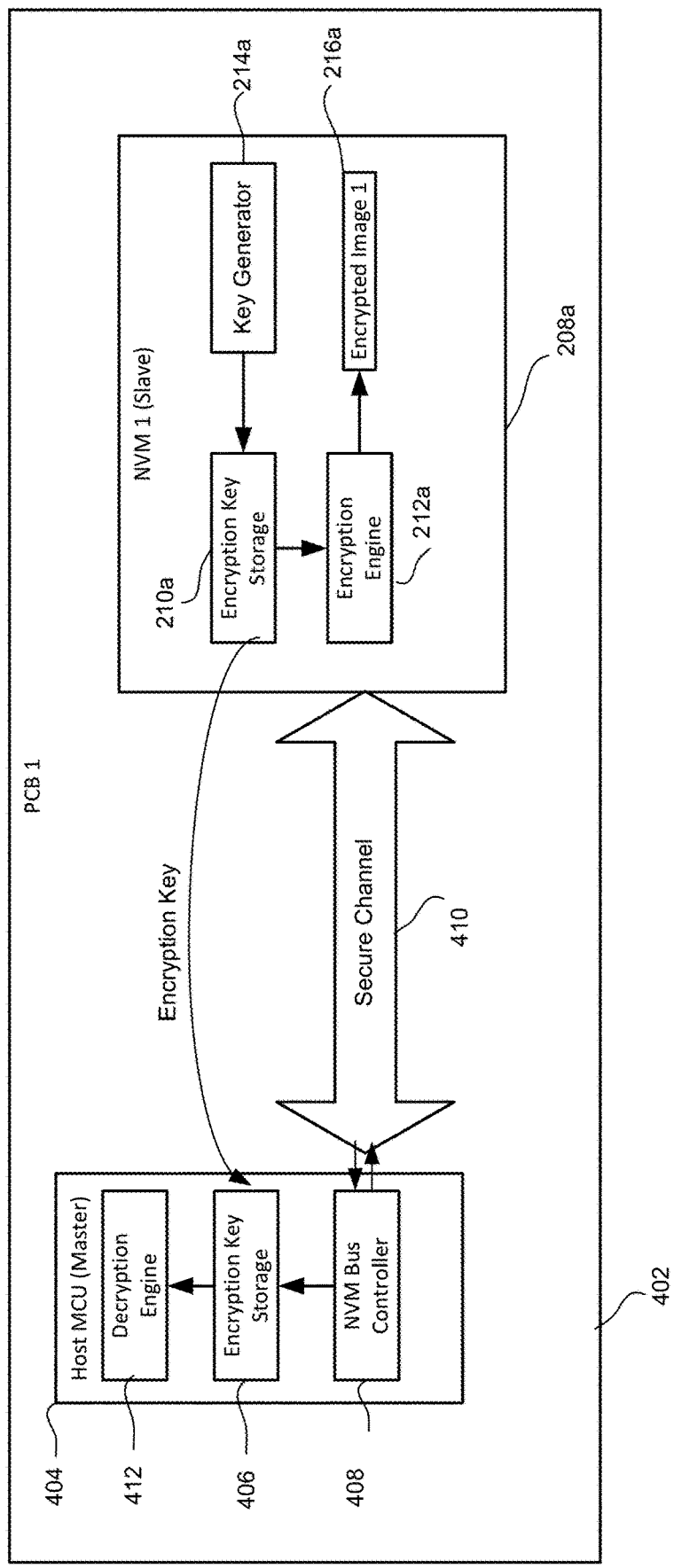
FIG. 4 is a diagrammatic representation of a printed circuit board with a self-encrypted NVM device undergoing provisioning in accordance with one embodiment of the present invention.
Figure 5A:
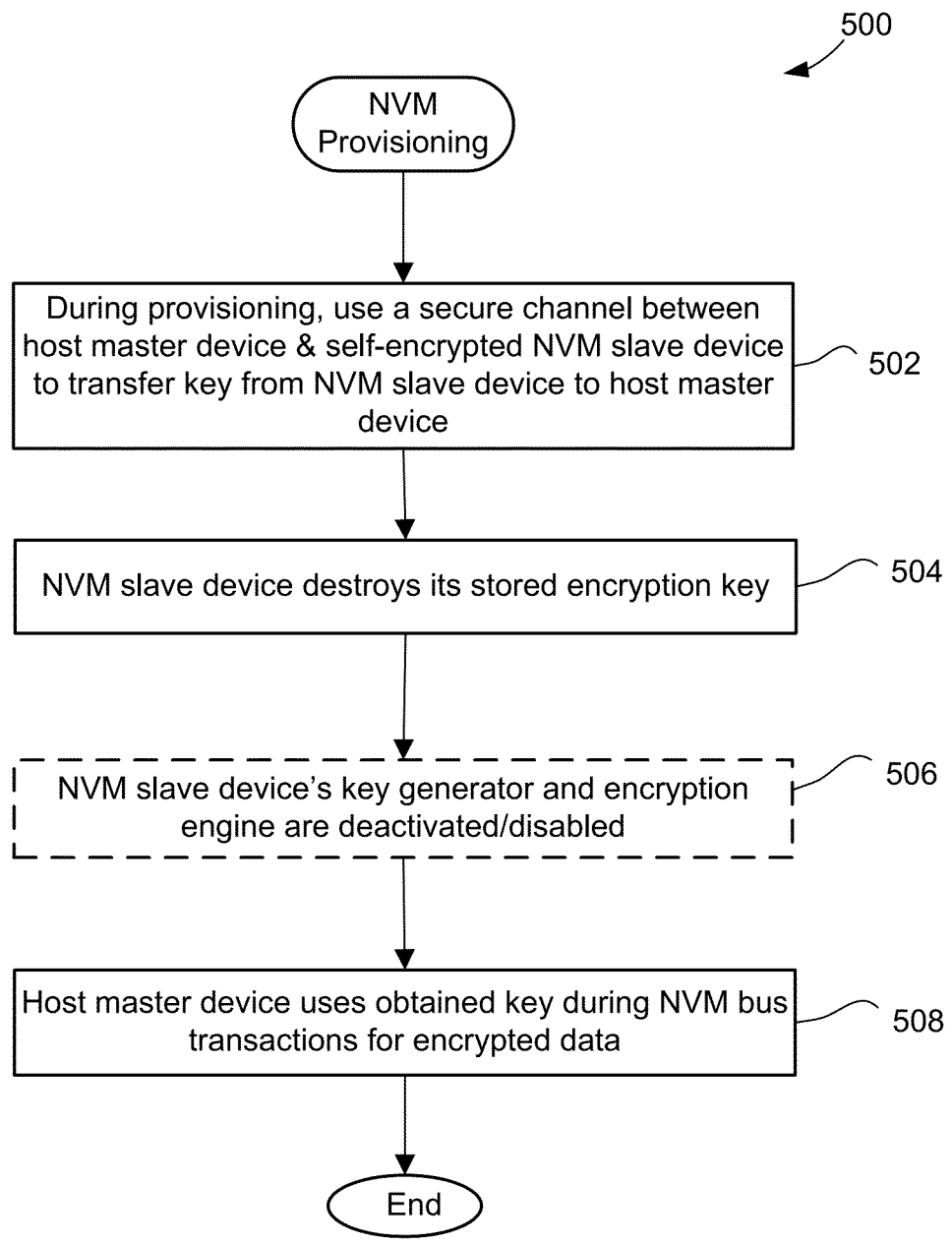
FIG. 5A is a flow chart illustrating a process for pairing and provisioning a self-encrypted NVM device in accordance with a specific implementation of the present invention.

After an NVM is programmed with an encrypted image, it can then be mounted onto a printed circuit board. FIG. 4 is a diagrammatic representation of a printed circuit board with a self-encrypted NVM undergoing provisioning by a host device in accordance with one embodiment of the present invention. FIG. 5A is a flow chart illustrating a process for pairing and provisioning a self-encrypted NVM (500) in accordance with a specific implementation of the present invention.

Initially after one or more NVMs are mounted onto the target PCB, each NVM device (e.g., 208a) may be provisioned and paired with a host master device, such as an MCU device, which may also include NVM. As shown in FIG. 5A, during provisioning, a secure channel between the host master device and a self-encrypted NVM slave device may be used to transfer an encryption key from the NVM slave device to the host master device in operation 502. In FIG. 4, secure channel 410 is set up between host master device 404 and NVM slave device 208a so that the encryption key can be securely transferred from the encryption key storage 210a of the NVM slave device 208a to the encryption key storage 406 of the host master device 404. The host master device 404 may be configured with an NVM bus controller 408 to implement this secure transfer, e.g., using public-private key pairing as further described herein.

Additionally, the host and slave devices will be configured/programmed with a command sequence for implementing this secure key transfer. For instance, the command sequence may include a key transfer request, where the NVM device encrypts the self-generated encryption key with the public key of an asymmetric key pair. The public key can be provisioned in the NVM device in an earlier step. The encrypted self-generated encryption key may then be transferred to the host to be decrypted using the private key from the asymmetric key pair. The private key can be provisioned in the host in an earlier step.

NVM devices that are configured to self-generate an encryption key and encrypt incoming image data will dramatically reduce the overall time required to assemble and provision systems using NVM devices during the manufacturing process. That is, this programming and self-encryption process could be performed in a ganged manner, instead of in-circuit. Performing the programming in a ganged manner will also reduce the requirement to have the entire PCB assembled prior to the in-circuit programming step.

Figure 6:
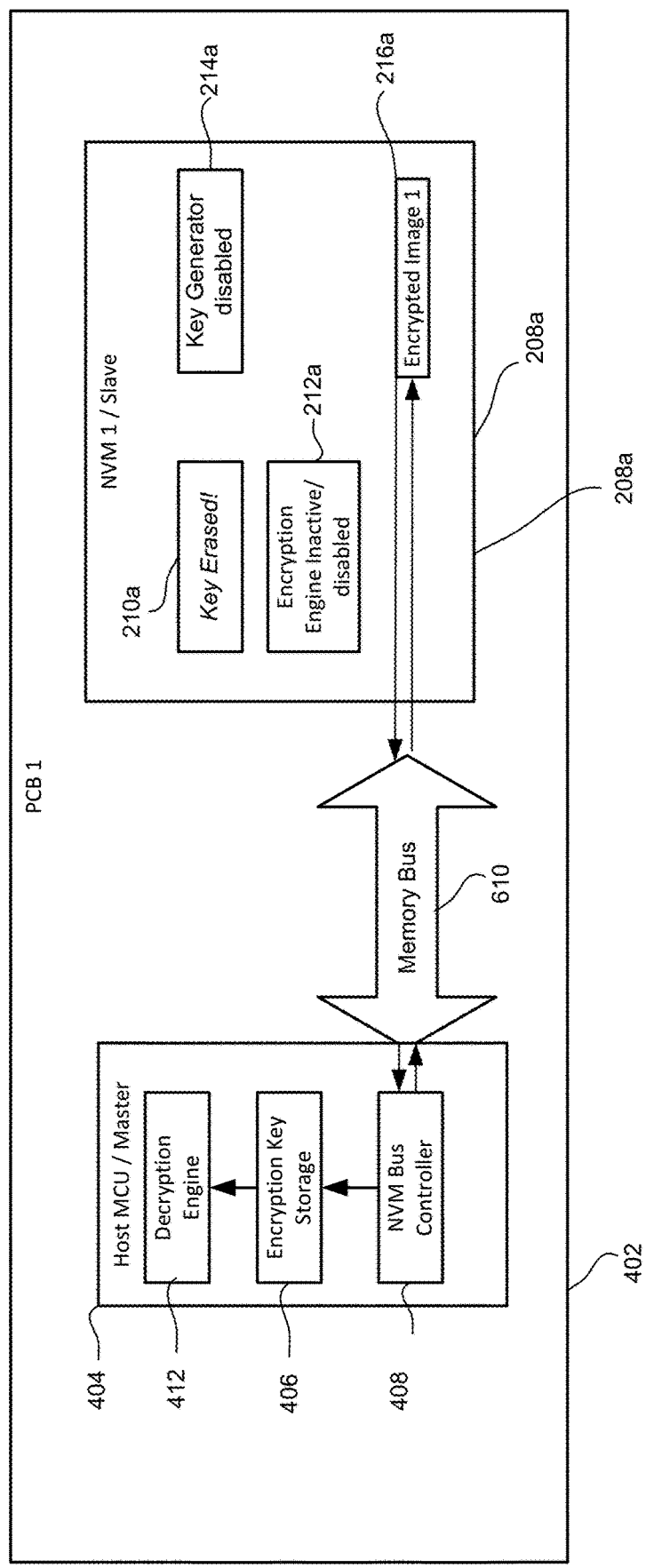
FIG. 6 represents the PCB of FIG. 4 after provisioning of the self-encrypted NVM device in accordance with a specific embodiment of the present invention.

After the encryption key is transferred (securely or insecurely) to the master host, the NVM slave device may then destroy its encryption key in operation 504. The key generator and encryption engine of the NVM slave device may also be optionally deactivated or disabled in operation 506. FIG. 6 represents the PCB of FIG. 4 after provisioning of the self-encrypted NVM slave device in accordance with a specific embodiment of the present invention. As shown, the key is erased from the encryption key storage 210a of the NVM slave device 208a. The key generator 214a and encryption engine 212a of the NVM slave device 208a are also both disabled.

After the host master device has provisioned the NVM slave, the host master device may then use the obtained encryption key during NVM bus transactions for encrypted data (e.g., via memory bus 610 of FIG. 6) in operation 508. That is, the host master device 404 can then read the encrypted image 216a in the NVM slave device, and the retrieved encrypted image can then be decrypted by the decryption engine 412 of the host master device 404 based on the encryption key obtained from encryption key storage 406. The host master and NVM slave devices can also perform non-encrypted transactions.

A secure channel may be set up in any suitable manner to facilitate secure transfer of the encryption key without allowing access to the encryption key by any entity external to the NVM slave device, besides the provisioning host master device. For example, a private-public key process may be used for the key exchange.

Figure 5B:
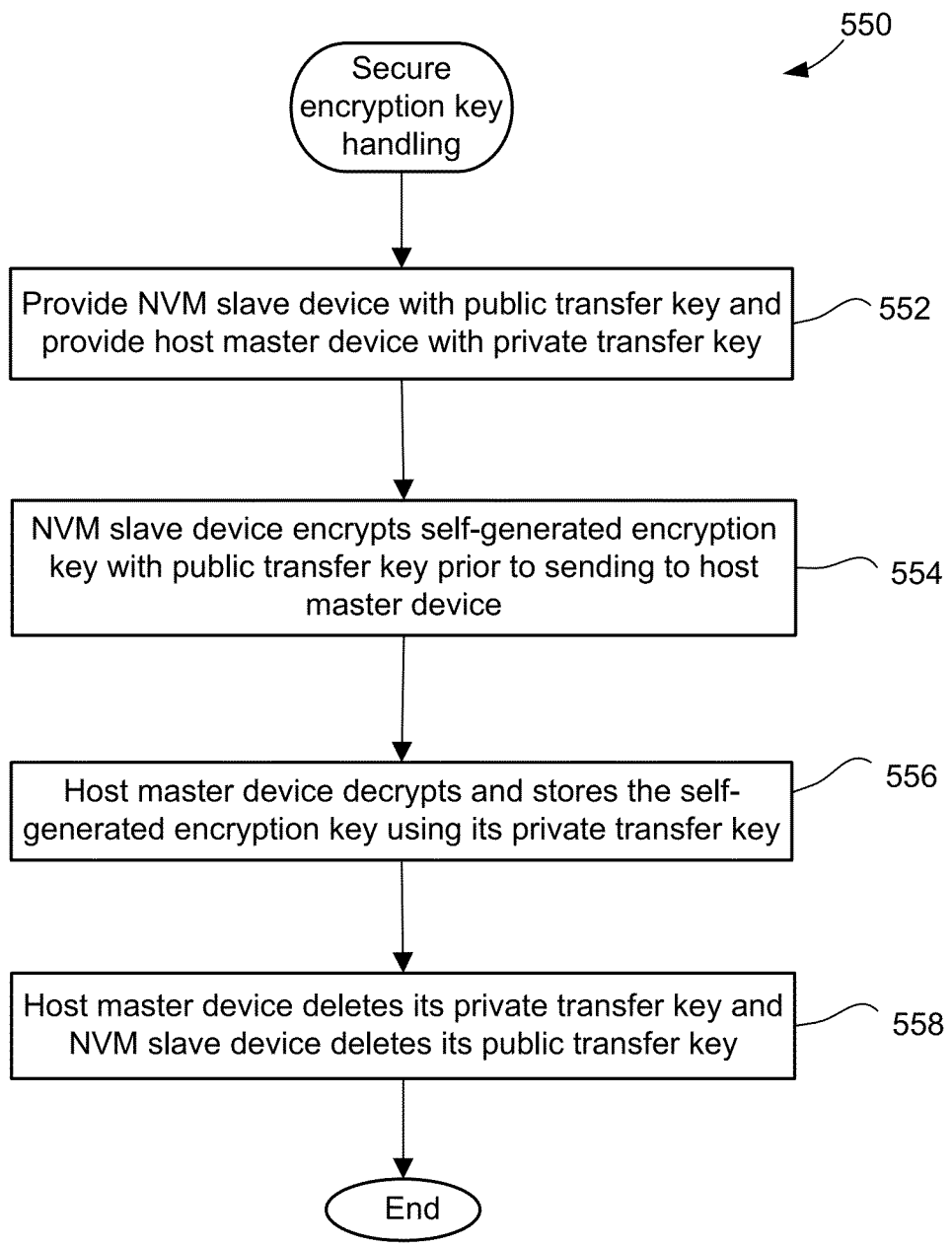
FIG. 5B is a flow chart illustrating a secure encryption key transfer process in accordance with a specific implementation of the present invention.

FIG. 5B is a flow chart illustrating a secure encryption key handling process in accordance with a specific implementation of the present invention. This process can be implemented on each NVM device. As shown, an NVM slave device may initially be provided with a public transfer key and the host master device is provided with a private transfer key in operation 552. For instance, the host master device may have access to the private key on another secure device or be configured with such private key provided by the NVM slave device provider or a $3^{rd}$ party in coordination with the NVM slave device provider. In one example, the NVM slave device may be shipped with software containing the private key, which can be uploaded to the host master device or accessible by such device from any form of computer readable medium.

The NVM slave device may then encrypt its self-generated encryption key with the public transfer key prior to sending such self-generated encryption key to the host master device in operation 554. The host master device may then decrypt and store the encrypted self-generated encryption key using its private transfer key in operation 556. The host master device may then delete its private transfer key and the NVM slave device delete its public transfer key in operations 558. In one embodiment, only the public key holder can encrypt the encryption key, while only the private key holder can decrypt the encryption key. Both public and private keys are preferably securely maintained (e.g., kept secret).

A secure channel is optional for the encryption key transfer. That is, the encryption key may be transferred without being encrypted by a public key or without implementing any type of security for the key. However, a secure channel for encryption key transfer is preferable for also maintaining integrity of the encrypted image data.

Certain embodiments allow secure access to the encryption key and the encrypted image data by the host master device from the NVM slave device without exposing the encryption key externally outside of the NVM slave device or the host master device. First, the encryption key can be securely transferred from the NVM device to the host device after which the encryption key is deleted and no longer exposed to any device. Second, the host master device can then securely access encrypted image data from the NVM slave device without exposing the underlying image data outside the slave or master device.

Figure 7:
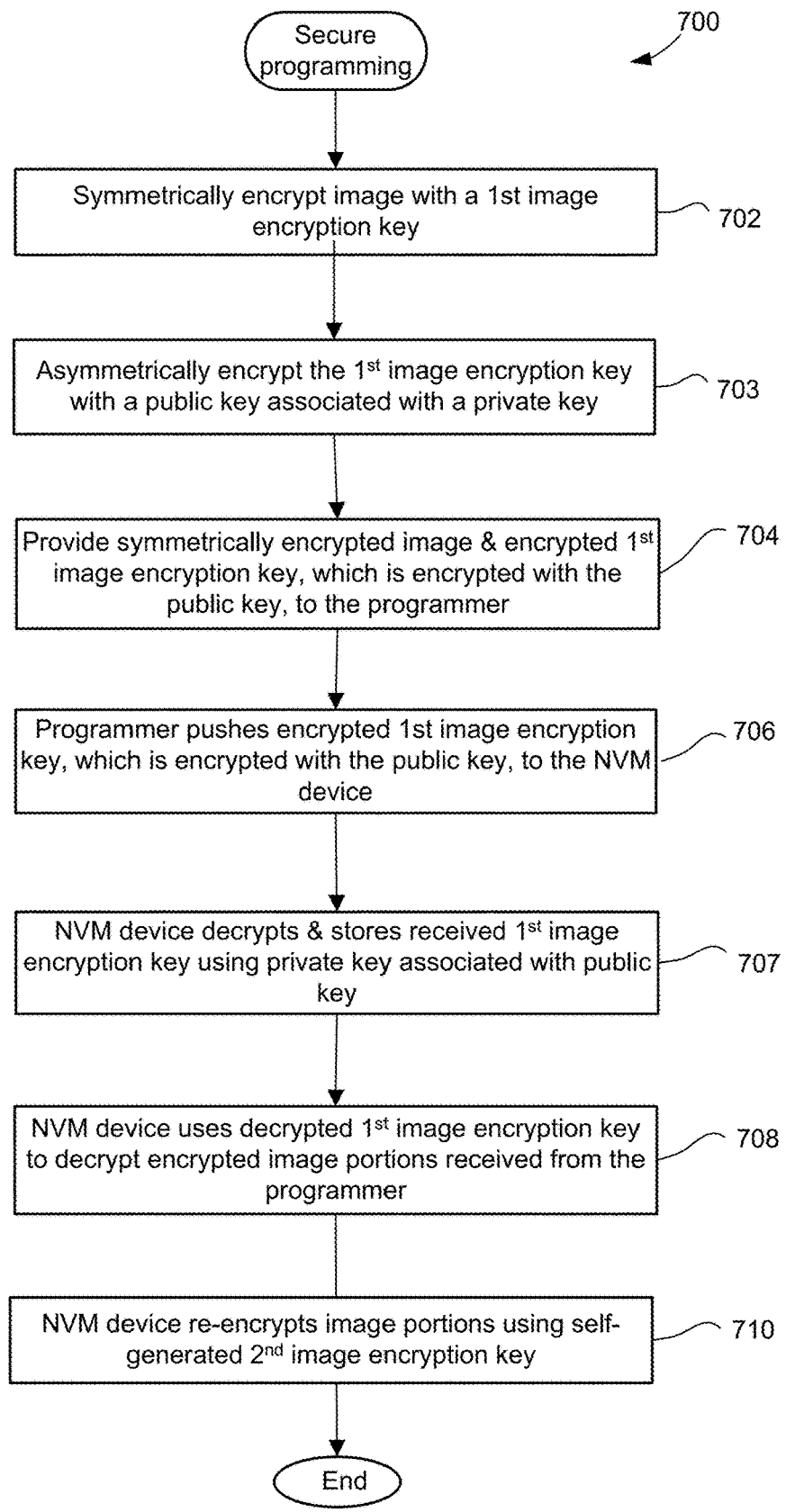
FIG. 7 is a flow chart illustrating a secure programming process in accordance with an alternative embodiment of the present invention.

Other security measures may be additionally implemented to protect the image during programming of the NVM devices. FIG. 7 is a flow chart illustrating a secure programming process 700 in accordance with an alternative embodiment of the present invention. Although secure programming may be implemented on all NVM devices that are going to be programmed with a same image, the secure programming process 700 is described with respect to a single NVM for illustration purposes.

Prior to programming each NVM device, the image can initially be symmetrically encrypted with a $1^{st}$ image encryption key in operation 702. This $1^{st}$ image encryption key is kept confidential and not exposed to potential attackers during the programming process. To accomplish confidentiality of this $1^{st}$ image encryption key, it may also be asymmetrically encrypted with a public key associated with a private key in operation 703. This asymmetric encryption may be securely performed by certain trusted entities of the NVM device manufacturers and owners. The $1^{st}$ image encryption key and the asymmetric public key may also be known only by a trusted entity, such as an agent of the NVM manufacturer or owner, and not exposed to entities of the programmer or external attackers. For instance, the corresponding private key may be programmed only into the NVM device so that it is not exposed to entities of the programmer or external attackers.

The symmetrically encrypted image and the encrypted $1^{st}$ image encryption key, which is encrypted with the public key, may then be provided to the programmer in operation 704. Thus, the image and $1^{st}$ image encryption key can remain confidential and unexposed during this transfer to the programmer.

The programmer may then push the encrypted $1^{st}$ image encryption key, which is encrypted with the public key, to the NVM device in operation 706. The NVM then decrypts and stores the $1^{st}$ image encryption key using the associated private key, which is stored on the NVM device and associated with the public key, in operation 707.

The NVM device may then use the stored decrypted $1^{st}$ image encryption key to decrypt any encrypted image portions that are received from the programmer in operation 708. The programming process can continue with the NVM device re-encrypting the decrypted image portions using its self-generated $2^{nd}$ image encryption key in operation 710, for example, as described above in FIG. 3.

The secure programming process using an encrypted image and private-public key pairs to encrypt the image encryption key may be implemented across all the NVM devices by using the same private-public key pairs for all the NVM devices that are to be programmed. Otherwise, different $1^{st}$ image encryption keys and private-public key pairs may be used for different NVMs.

In alternative embodiments, the encryption key for the NVM programming could be generated and programmed into an NVM device by a third party, instead of self-generated, prior to gang programming. In another example, a database of encryption keys could be used during the gang programming step and then "re-associated" when the memory is paired with the Host MCU on the PCB. For instance, a host device can have access to a database of encryption keys associated with unique identifiers for corresponding NVM devices. That is, a set of keys for a specific set of NVM devices, which are to be used by a particular company, can be only provided to such company. During provisioning of a particular NVM device, the host device can then retrieve the encryption key associated with the NVM device from the database, instead of the NVM device. In other embodiments, the encryption key could be based on a non-random number, such as a unique identifier of the NVM device, such as the serial number.

Figure 8:
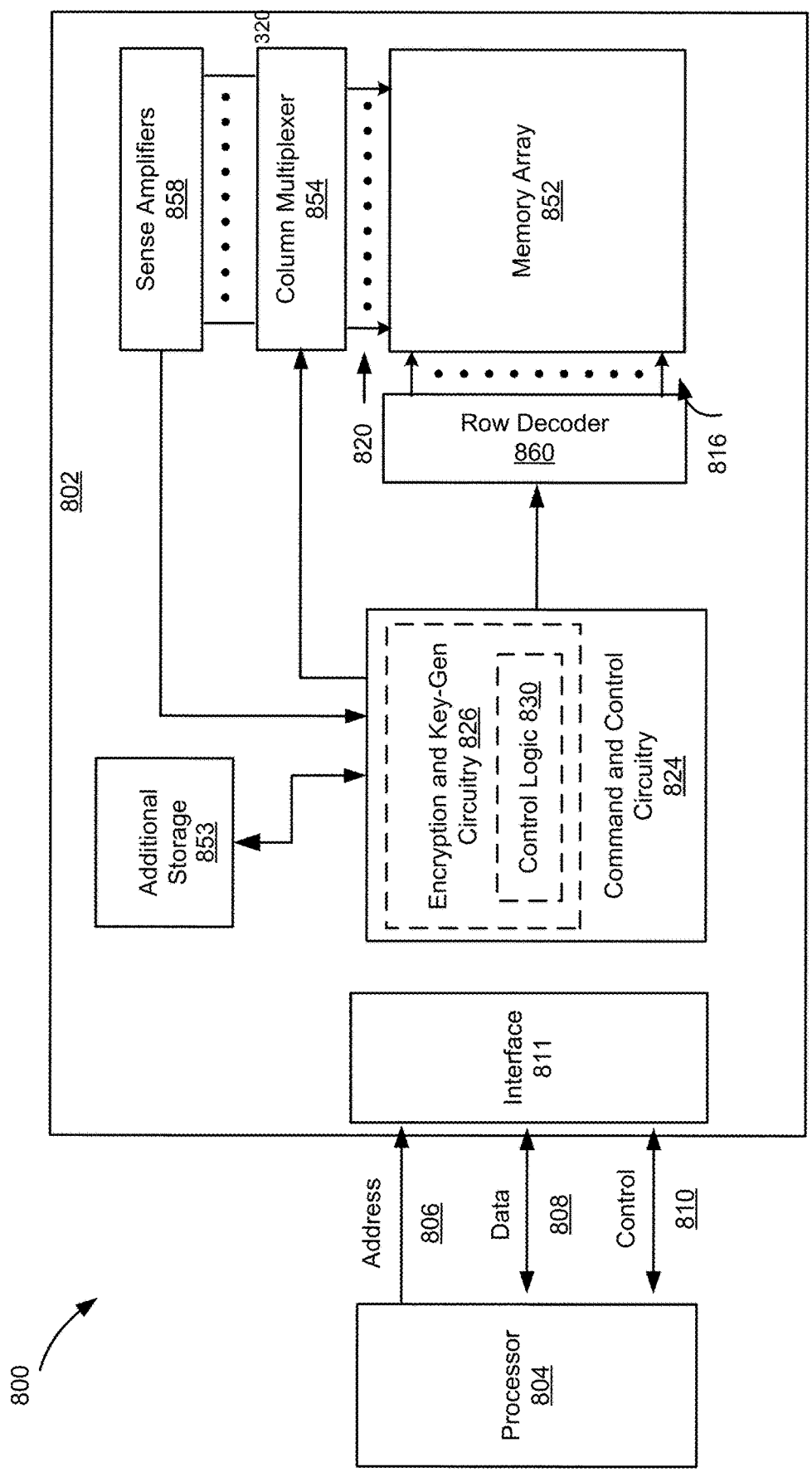
FIG. 8 illustrates a block diagram of a processing system including an NVM device, implemented in accordance with some embodiments.

FIG. 8 illustrates a block diagram of a processing system including an NVM device, implemented in accordance with some embodiments. Processing system 800 generally includes non-volatile memory 802 coupled to processor 804 in a conventional manner via address bus 806, data bus 808, and control bus 810. It will be appreciated by those skilled in the art that the processing system 800 of FIG. 8 has been simplified for the purpose of illustrating the present invention and is not intended to be a complete description.

In various embodiments, processing system 800 may include processor 804 which may be a type of general purpose or special purpose processing device. For example, in one embodiment the processor can be a processor in a programmable system or controller that further includes a non-volatile memory, such as a Programmable System On a Chip or PSoC™ controller, commercially available from Cypress Semiconductor of San Jose, Calif.

Non-volatile memory 802 may include memory array 852. Accordingly, memory array 852 may be organized as rows and columns of non-volatile memory cells (not shown in this figure). In embodiments, non-volatile memory cells may include but not limited to flash memory cells, F-RAM, M-RAM, R-RAM, EEPROM, SONOS cells. Memory array 852 is coupled to row decoder 860 via multiple select lines and read lines 816 (at least one select line and one read line for each row of the memory array). Memory array 852 is further coupled to column multiplexer 854 via multiple bit lines 820. It will be appreciated that common source lines may be implemented as part of lines 820 or lines 816. Memory array 852 may be coupled to a plurality of sense amplifiers 858 to read multi-bit words therefrom.

The NVM 802 may also include additional storage 853, such as SRAM, for temporarily storing image chunks, encrypted image chunks or fragments prior to programming into the array, etc.

Non-volatile memory 802 further includes command and control circuitry 824 to control row decoder 860, column multiplexer 854, and sense amplifiers 858, and to receive read data from sense amplifiers 858, as well as to generate the voltages needed for operation of memory array 852, which may be routed to row decoder 860 and column multiplexer 854.

In various embodiments, control circuitry 824 may include one or more processors and dedicated memory that may be configured to implement the previously described techniques. In this way, system 800 may have a dedicated processing unit, such as control circuitry 824, which may be configured to implement the previously described processes. Moreover, in some embodiments, control circuitry 824 may be implemented in an application specific integrated circuit (ASIC), or may be implemented in reprogrammable logic of a field programmable gate array.

Command and control circuitry 824 may also include encryption (and decryption) and key generation circuitry 826 for performing encryption on received images based on a self-generated encryption key as described above. Accordingly, encryption and key generation circuitry may include control logic, such as control logic 830.

In various embodiments, command and control circuitry 824 may be further configured to control row decoder 860 to select a first row of memory array 852 for a program operation by applying a voltage to a first select line in the first row and to deselect a second row of the memory array by applying another voltage to a second select line in the second row. Command and control circuitry 824 may be further configured to control column multiplexer 854 to select a memory cell in the first row for programming by applying a voltage to a first bit line in a first column, and to inhibit an unselected memory cell in the first row from programming by applying another voltage to a second bit line in a second column. Row decoder 860 or column multiplexer 854 may be further configured to apply a voltage to one or more common source lines that may be coupled to memory cells included in memory array 852.

In various embodiments, communications interface 811 may be configured to send and receive data to other system components or may be configured to send and receive packets or data segments over a network. For example, communications interface 811 may be communicatively coupled to a user interface device via a bus or a communications network. Communications interface 811 may be configured to receive data from a user interface device which may be included in a data processing system or computer system 804. In various embodiments, such data may include an input identifying wear leveling parameters from a user. In various embodiments, communications interface 811 may be a device that supports Ethernet interfaces, frame relay interfaces, cable interfaces, and DSL interfaces. In addition, various very high-speed interfaces may be provided such as fast Ethernet interfaces, Gigabit Ethernet interfaces, HSSI interfaces, POS interfaces, FDDI interfaces and the like. Generally, these interfaces may include ports appropriate for communication with the appropriate media. In some cases, they may also include an independent processor and, in some instances, volatile such as some type of RAM.

Figure 9:
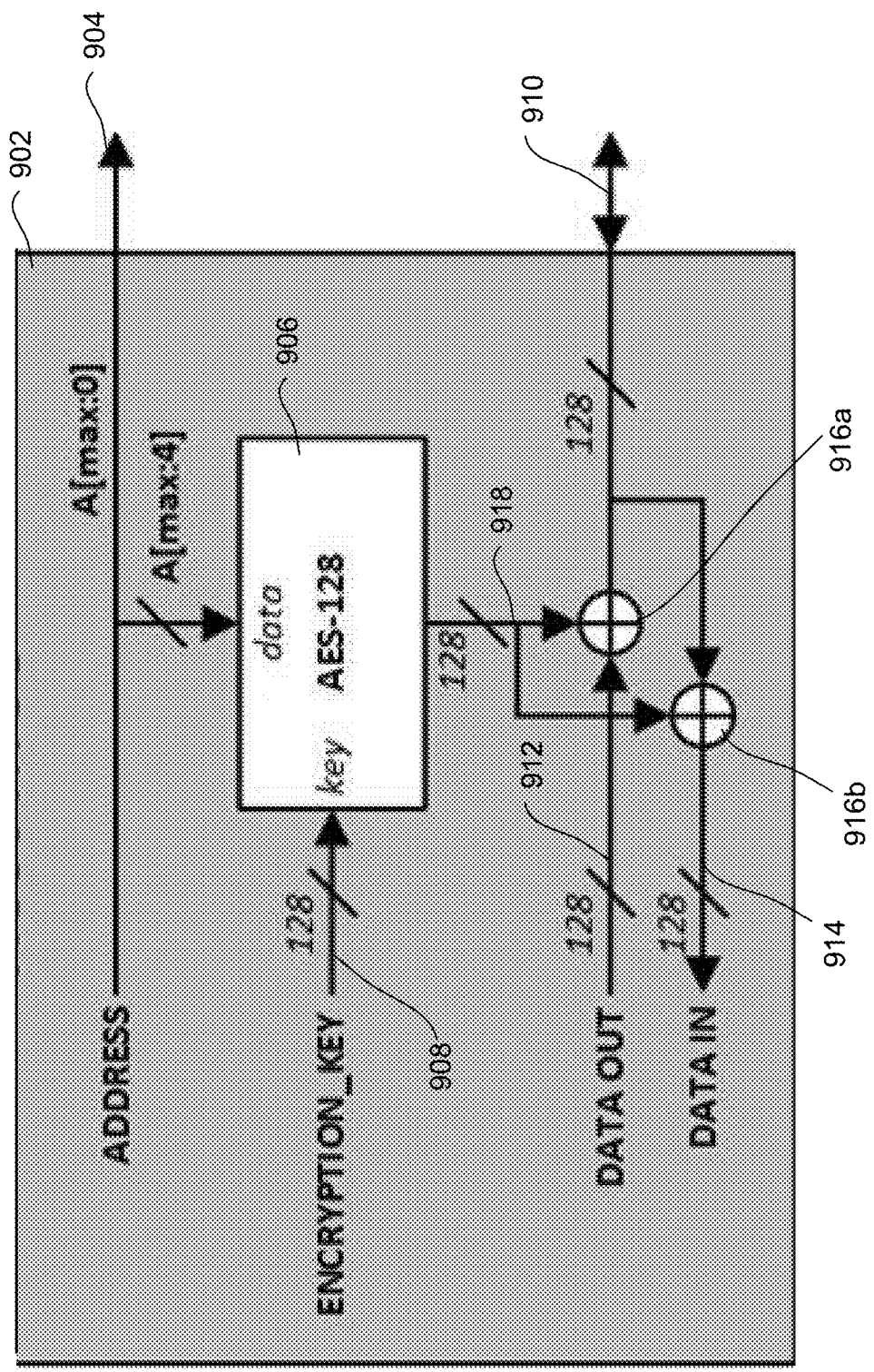
FIG. 9 is a diagrammatic representation of encryption circuitry in accordance with one embodiment of the present invention.

The encryption (and decryption) circuitry may be implemented in any suitable combination of hardware and/or software. FIG. 9 is a diagrammatic representation of encryption circuitry 902 in accordance with one embodiment of the present invention. As shown, the encryption circuitry may include an Advanced Encryption Standard (AES) block 906 for performing one or more encryption algorithm(s) on an image portion received serially on 4 address lines 904 based on a received encryption key 908. In this example, a streaming cipher is implemented to minimize latencies although other types may be used. The image data may be input on selected address lines 904 in 16-byte chunks. Of course, any suitable input pins of the NVM device 802 may be utilized for inputting image data to be encrypted. In this example, the key has a 128-bit length although other lengths can be used. In this implementation, blocks are transferred on 16-byte boundaries. For instance, programming 1 byte of data may require 16 bytes of storage without allowing incremental programming or overwriting.

Encrypted data may be correspondingly output in 16-byte chunks via data output lines 910, for example, to an NVM array. The encryption circuitry 902 may also include multi-bit XOR gates 916*a* and 916*b* that can be driven with 0's by the AES block 906 when data is to be transferred in an unencrypted manner.

Although the foregoing invention has been described in some detail for purposes of clarity of understanding, it will be apparent that certain changes and modifications may be practiced within the scope of the appended claims. It should be noted that there are many alternative ways of implementing the processes, systems, and apparatus of the present invention. Accordingly, the present embodiments are to be considered as illustrative and not restrictive, and the invention is not to be limited to the details given herein.

What is claimed is:

1. A method of programming a plurality of nonvolatile memory (NVM) devices, the method comprising:
   in each of the plurality of NVM devices, self-generating and storing a unique encryption key;
   in each of the plurality of NVM devices, concurrently receiving an image from a multiple-device programming system to which all of the plurality of NVM devices are communicatively coupled;
   each NVM device encrypting the image, which was received, using such NVM device's unique encryption key to produce a unique encrypted image for each NVM device;
   each NVM device storing its unique encrypted image within a nonvolatile memory of such NVM device; and
   verifying whether the image was programmed, encrypted, and stored accurately in each page of each NVM device.

2. The method of claim 1, wherein the self-generating of the unique encryption key in each NVM device is performed by a true random number generator of each NVM device.

3. The method of claim 1, wherein the self-generating of the unique encryption key in each NVM device is performed by a physical unclonable function (PUF) applied to a microstructure having a unique response in each NVM device.

4. The method of claim 1, wherein the self-generating of the unique encryption key in each NVM device is based on a unique identifier stored in each NVM device.

5. The method of claim 1, wherein the self-generating of the unique encryption key in each NVM device is based on one or more encryption key parameters configured in each NVM device.

6. The method of claim 1, wherein the image is received in chunks, and the method further comprising collecting and storing, by each NVM device, a number of the chunks, which are received, that corresponds to a page size of each NVM device prior to encrypting the chunks collected together into an encrypted collection of chunks that are stored in a nonvolatile memory array.

7. The method of claim 1, further comprising deactivating the verifying operation for each NVM device that pass verification.

8. The method of claim 1, further comprising:
   after a first one of the NVM devices has completed storing of its unique encrypted image within a nonvolatile memory of the first NVM device, mounting the first NVM device on a printed circuit board that include a host device;

transferring the unique encryption key from the first NVM device to the host device;

after the unique encryption key is transferred, the first NVM device destroying its unique encryption key that is stored in the first NVM device; and after the unique encryption key is transferred, the host device performing field operations by accessing one or more portions of the encrypted image from the first NVM device and using the unique encryption key, which was transferred, to decrypt the accessed one or more portions of the encrypted image.

9. The method of claim 8, wherein the unique encryption key from the first NVM device is transferred using a secure channel by use of a public key paired with a private key for (i) the first NVM device encrypting the unique encryption key with the public key and (ii) the host device decrypting the unique encryption key with the private key that is paired with the private key.

10. The method of claim 1, wherein the image received by each NVM device is in an encrypted form that is based on a second encryption key, and the method further comprises:

in the NVM device, receiving the second encryption key in an encrypted form that is based on a public encryption key associated with a private encryption key;

providing the public encryption key to each NVM device;

prior to encrypting and storing the received image, each NVM device decrypting the second encryption key using the private encryption key; and prior to encrypting and storing the received image, each NVM device decrypting the encrypted image using the decrypted second encryption key.

11. A nonvolatile memory (NVM) device, comprising:

an NVM array for storing data;

a key generator for generating and storing a unique encryption key; and at least one controller for performing the following operations:

receiving an image from a multiple-device programming system to which the NVM device and a plurality of other NVM devices are communicatively coupled for concurrently receiving the image;

encrypting the image, which was received, using the unique encryption key to produce a unique encrypted image;

storing the unique encrypted image within the NVM array; and verifying whether the image was programmed, encrypted, and stored accurately in the NVM array and thereafter deactivating such verifying operation if the verification passes.

12. The device of claim 11, wherein the key generator is a true random number generator of each NVM device.

13. The device of claim 11, wherein the key generator is further configured to use a physical unclonable function (PUF) applied to a microstructure having a unique response in each NVM device.

14. The device of claim 11, wherein the generating of the unique encryption key in is further based on a unique identifier stored in each NVM device.

15. The device of claim 11, further comprising one or more encryption parameter registers, and wherein the generating of the unique encryption key in is further based on one or more encryption key parameters configured in the one or more encryption parameter registers.

16. The device of claim 11, wherein the image is received in chunks, and the controller is further configured for collecting and temporarily storing a number of the chunks, which were received, that correspond to a page size of the NVM array prior to encrypting the chunks collected together into an encrypted collection of chunks that are stored in the NVM array.

17. The device of claim 11, wherein the image received by each NVM device is in an encrypted form that is based on a second encryption key, and the controller being further configured for:

receiving the second encryption key in an encrypted form that is based on a public encryption key associated with a private encryption key;

receiving the public encryption key;

prior to encrypting and storing the received image, decrypting the second encryption key using the private encryption key; and prior to encrypting and storing the received image, decrypting the encrypted image using the decrypted second encryption key.

18. A system, comprising:

a printed circuit board;

a host device mounted on the printed circuit board; and the NVM device of claim 11 mounted on the printed circuit board and communicatively coupled with the host device, wherein the controller of the NVM device being further configured for (i) transferring the unique encryption key to the host device and (ii) after the unique encryption key is transferred, destroying the unique encryption key that is stored in the NVM array of the NVM device; and wherein the host device is further configured for, after the unique encryption key is transferred, performing field operations by accessing one or more portions of the encrypted image from the NVM array of the NVM device and using the transferred encryption key to decrypt the accessed one or more portions of the encrypted image.

19. The system of claim 18, wherein the unique encryption key from the NVM device is transferred using a secure channel by use of a public key paired with a private key for (i) the NVM device encrypting the unique encryption key with the public key and (ii) the host device decrypting the unique encryption key with the private key that is paired with the private key.

* * * * *